United States Patent
Bell et al.

(10) Patent No.: US 12,330,891 B2
(45) Date of Patent: Jun. 17, 2025

(54) SYSTEMS, METHODS, AND APPARATUSES FOR LOADING, SECURING, TRANSPORTING, AND DEPOSITING OBJECTS

(71) Applicant: UNITED PARCEL SERVICE OF AMERICA, INC., Atlanta, GA (US)

(72) Inventors: Julian Leland Bell, Decatur, GA (US); Julio Gil, Veldhoven (NL)

(73) Assignee: United Parcel Service of America, Inc., Atlanta, GA (US)

( * ) Notice: Subject to any disclaimer, the term of this patent is extended or adjusted under 35 U.S.C. 154(b) by 343 days.

(21) Appl. No.: 17/734,679

(22) Filed: May 2, 2022

(65) Prior Publication Data
US 2022/0348427 A1    Nov. 3, 2022

Related U.S. Application Data

(60) Provisional application No. 63/183,485, filed on May 3, 2021.

(51) Int. Cl.
*B65G 67/04* (2006.01)
*B25J 5/00* (2006.01)
(Continued)

(52) U.S. Cl.
CPC ............... *B65G 67/04* (2013.01); *B25J 5/00* (2013.01); *B25J 11/008* (2013.01); *B65G 67/46* (2013.01)

(58) Field of Classification Search
CPC .. B62D 33/02; B62D 33/0207; B62D 33/042; B62D 57/032; B25J 11/008; B25J 5/00;
(Continued)

(56) References Cited

U.S. PATENT DOCUMENTS

| | | | | |
|---|---|---|---|---|
| 11,358,510 B1* | 6/2022 | Buttolo | ................... | B60P 3/007 |
| 2008/0121188 A1* | 5/2008 | Axelrod | ................. | A01K 1/033 |
| | | | | 119/499 |

(Continued)

FOREIGN PATENT DOCUMENTS

| | | |
|---|---|---|
| CN | 210853420 U | 6/2020 |
| DE | 102018204187 A1 | 9/2019 |

(Continued)

OTHER PUBLICATIONS

Invitation to Pay Addition Fees and Partial International Search Report received for PCT Patent Application No. PCT/US2022/027485, mailed on Aug. 5, 2022, 14 pages.

(Continued)

*Primary Examiner* — Glenn F Myers
(74) *Attorney, Agent, or Firm* — Shook, Hardy & Bacon L.L.P.; Elena K. McFarland

(57) ABSTRACT

Loading, securing, transporting, and/or depositing objects as well as systems, methods, and apparatuses for the same, including those that operate in automated or semi-automated fashion, are disclosed herein. In one embodiment, a mobile robotic platform is provided. The mobile robotic platform is designed to receive, transport, and deposit objects at desired destinations. In another embodiment, a flat transport surface, e.g., a pallet, is provided. The flat transport surface is designed to facilitate efficient loading, transport, and deposit of objects, e.g., between automated or semi-automated handling systems, in one aspect. In another embodiment, a system for handling objects is provided. The system is designed to support automated or semi-automated loading and/or unloading of objects, e.g., onto or from a mobile robotic platform, and may be implemented in a vehicle, in one aspect.

7 Claims, 10 Drawing Sheets

(51) Int. Cl.
*B25J 11/00* (2006.01)
*B65G 67/46* (2006.01)

(58) Field of Classification Search
CPC .......... B65G 67/46; B65G 67/04; B65G 1/04;
B60P 1/5409; B60P 3/007
See application file for complete search history.

(56) References Cited

U.S. PATENT DOCUMENTS

| | | | |
|---|---|---|---|
| 2010/0052353 A1* | 3/2010 | Shea ...................... | B60R 11/06 |
| | | | 296/37.16 |
| 2019/0168392 A1* | 6/2019 | Väin ..................... | B65G 1/0407 |
| 2019/0302775 A1* | 10/2019 | Palan ................... | B62D 57/024 |
| 2019/0367099 A1 | 12/2019 | Walkemeyer et al. | |
| 2020/0277137 A1* | 9/2020 | Bastian, II .............. | B66F 9/065 |
| 2021/0132625 A1* | 5/2021 | Gillett .................. | G05D 1/0088 |
| 2021/0276274 A1* | 9/2021 | Halbritter ................ | B64F 5/10 |
| 2021/0387808 A1* | 12/2021 | Kalouche ............. | G06Q 10/083 |
| 2022/0204260 A1* | 6/2022 | Zhou ......................... | B60P 7/06 |

FOREIGN PATENT DOCUMENTS

| | | |
|---|---|---|
| DE | 102019201131 A1 | 7/2020 |
| WO | 2012/125903 A2 | 9/2012 |

OTHER PUBLICATIONS

International Preliminary Report on Patentability received for PCT Patent Application No. PCT/US2022/027485, mailed on Nov. 16, 2023, 15 pages.
International Search Report and Written Opinion received for PCT Patent Application No. PCT/US2022/027485, mailed on Oct. 4, 2022, 20 pages.

\* cited by examiner

SYSTEMS, METHODS, AND APPARATUSES FOR LOADING, SECURING, TRANSPORTING, AND DEPOSITING OBJECTS

CROSS-REFERENCE TO RELATED APPLICATIONS AND PRIORITY CLAIM

This non-provisional patent application claims priority to co-pending U.S. provisional patent app. No. 63/183,485, filed May 3, 2021, and titled "Systems, Methods, and Apparatuses for Loading, Securing, Transporting, and Depositing Objects," the entire contents of which is incorporated herein by reference.

TECHNICAL FIELD

The field relates to handling of objects.

BACKGROUND

There is frequently a need, e.g., in a logistics network operation, to load, transport, and deposit objects, e.g., parcels with contents, efficiently and precisely. In addition, there can be unique challenges when such operations are performed using automated or semi-automated systems, due to reduced reliance on manual handling. Therefore, improved systems, methods, and apparatuses for loading, securing, transporting, and depositing objects in automated or semi-automated fashion are needed.

SUMMARY

This summary is intended to introduce a selection of concepts in a simplified form that are further described below in the detailed description section of this disclosure. This summary is not intended to identify key or essential features of the claimed subject matter, nor is it intended to be used as an aid in isolation to determine the scope of the claimed subject matter.

In brief, and at a high level, this disclosure describes, among other things, embodiments that support loading, securing, transporting, and depositing objects in automated or semi-automated fashion. These embodiments may be implemented to improve the efficiency, accuracy, and speed of object handling, e.g., in a logistics network operation, among other applications. In one embodiment, a mobile robotic platform is provided. The mobile robotic platform is designed to receive, transport, and deposit objects at different destinations, e.g., loading or delivery destinations. In another embodiment, a flat transport surface, e.g., such as a pallet, is provided. The flat transport surface, e.g., pallet, may be configured to facilitate efficient loading, transport, and deposit of objects, e.g., between automated or semi-automated handling systems, in one aspect. In another embodiment, a system for handling objects is provided. The system may be configured to support automated or semi-automated loading and/or unloading of objects, e.g., onto or from a mobile robotic platform, and may be implemented in a vehicle, in one aspect. These embodiments may be used in individual applications, or may be used in different combinations, e.g., in a logistics network operation.

The term "object" as used herein should be interpreted broadly, to include any one or combination of items that can be transported to or from a destination. For example, in one instance, an object may be a parcel that is transported to a destination in a logistics network.

The term "mobile robotic platform" as used herein should be interpreted broadly, to include any apparatus or configuration of components that is mobile, and that can operate, at least partially, in automated or semi-automated fashion. The mobile robotic platform may be one configured to perform a "last distance delivery," e.g., to a recipient, e.g., through a logistics network. In addition, the mobile robotic platforms described herein may be ground-based, air-based, and/or autonomously operated or at least partially autonomously operated. Example mobile robotic platforms contemplated herein include, without limitation, multi-leg robots (e.g., bi-leg, tri-leg, quad-leg, and the like), wheel-driven robots, track-driven robots, aerial drones, or other mobile configurations.

The term "logistics network" as used herein should be interpreted broadly, to include any one or combination of components, systems, technology, and/or people or locations that operate to transport objects to different destinations.

BRIEF DESCRIPTION OF THE DRAWINGS

The embodiments described herein configured to load, secure, transport, and/or deposit objects are described in detail with reference to the attached figures, which illustrate non-limiting examples of the disclosed subject matter, wherein.

DETAILED DESCRIPTION

Figure 1:
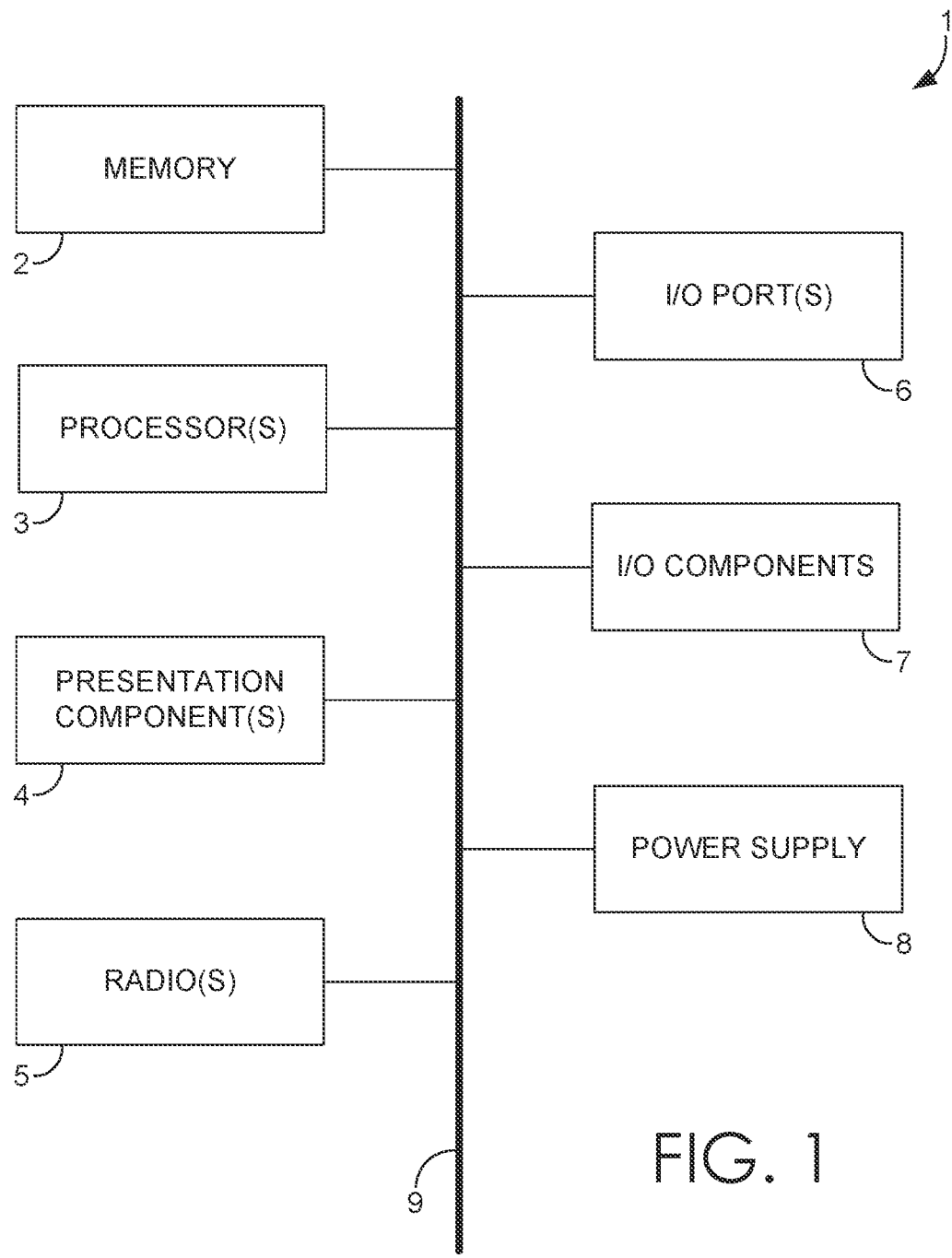
FIG. 1 depicts an example computing system suitable for supporting operation of the embodiments described herein.

This detailed description is provided in order to meet statutory requirements. However, this description is not intended to limit the scope of the invention. Rather, the claimed subject matter may be embodied in other ways, to include different steps, different combinations of steps, different features, and/or different combinations of features, similar to those described in this disclosure, and in conjunction with other present or future technologies. Moreover, although the terms "step" and "block" may be used herein to identify different elements of methods employed, the terms should not be interpreted as implying any particular order among or between different elements except when the order is explicitly described.

In general, embodiments that enable and support the loading, securing, transporting, and/or depositing of objects in automated or semi-automated fashion are described herein, among other things. These embodiments may be implemented in a logistics network operation to improve the efficiency, accuracy, and speed of processing, handling, and delivering objects, e.g., parcels with contents, to designated locations and/or recipients, e.g., including along a last distance of a delivery route. Further embodiments, details, and descriptions are provided below with reference to FIGS. 1-12B.

The subject matter described herein may be implemented as a method, a system, and/or a computer program product, among other things. Accordingly, certain aspects may take the form of hardware, or software, or may be a combination of software and hardware. A computer program that includes computer-useable instructions embodied on one or more computer-readable media may also be used. The subject matter described herein may further be implemented as hard-coded into the mechanical design of computing components and/or may be built into a system for loading, securing, transporting, and/or depositing objects.

The computer-readable media described herein may include volatile media, non-volatile media, removable media, and non-removable media, and may also include media readable by a database, a switch, and/or various other network devices. Network switches, routers, and related components are conventional in nature, as are methods of communicating with the same, and thus, further elaboration is not provided here. By way of example, and not limitation, computer-readable media may include computer storage media and/or non-transitory communications media.

The computer storage medias, computer-readable medias, and/or machine-readable medias described herein may include media implemented in any method or technology for storing information. Examples of stored information include computer-useable instructions, data structures, program modules, and/or other data representations. Computer storage media may include, but is not limited to, RAM, ROM, EEPROM, flash memory or other memory technology, CD-ROM, digital versatile discs (DVD), holographic media or other optical disc storage, magnetic cassettes, magnetic tape, magnetic disk storage, and other storage devices. These memory components may store data momentarily, temporarily, and/or permanently, and are not limited to the examples provided herein.

Looking now at FIG. 1, a block diagram of an example computing device 1 suitable for supporting the operations described herein is provided, in accordance with an embodiment hereof. It should be understood that although some components depicted in FIG. 1 are shown in the singular, they may be plural, and the components may be connected in a different, e.g., local or distributed, configuration. For example, computing device 1 might include multiple processors and/or multiple radios. As shown in FIG. 1, computing device 1 includes a bus 9 that directly or indirectly connects different components together, including memory 2, processor(s) 3, presentation component(s) 4 (if applicable), radio(s) 5, input/output (I/O) port(s) 6, input/output (I/O) component(s) 7, and power supply 8.

The memory 2 may take the form of the memory components described herein. Thus, further elaboration will not be provided here, but memory 2 may include any type of tangible medium that is capable of storing information, such as a database. A database may include any collection of records, data, and/or other information. In one embodiment, memory 2 may include a set of computer-executable instructions that, when executed, perform different functions or steps described herein. These instructions will be referred to as "instructions" or an "application" for short. The processor 3 may actually be multiple processors that may receive instructions and process them accordingly. The presentation component 4 may include a display, a speaker, a screen, a portable digital device, and/or other components that can present information through visual, auditory, and/or other tactile cues (e.g., a display, a screen, a lamp, a light-emitting diode (LED), a graphical user interface (GUI), and/or a lighted keyboard).

The radio 5 may support communications over a network, and may additionally or alternatively support or facilitate different types of wireless communications, such as Wi-Fi, WiMAX, LTE, Bluetooth, and/or VoIP communications, among other communication protocols. In various aspects, the radio 5 may be configured to support multiple technologies, and/or multiple radios may be configured and utilized to support multiple technologies.

The input/output (I/O) ports 6 may take a variety of forms. Example I/O ports may include a USB jack, a stereo jack, an infrared port, and/or other proprietary communication ports. The input/output (I/O) components 7 may comprise one or more keyboards, microphones, speakers, touchscreens, and/or any other item useable to directly or indirectly input data into the computing device 1. The power supply 8 may include electrical sources, batteries, generators, fuel cells, and/or any other component that may act as a power source to supply power to computing device 1 and to other components described herein.

Overall, and broadly speaking, described herein are systems, mechanisms, apparatuses, and technologies that allow objects, e.g., packages or parcels, or carriers supporting the same, to be acquired, segregated, secured, transported, and/or deposited at designated locations, including in automated or semi-automated fashion, in different aspects. These embodiments may be utilized in a delivery context, e.g., in a logistics network operation. The improvements described herein may be provided additionally with a mobile robotic platform that includes an adaptable storage system used for securely transporting objects, e.g., packages, parcels, or carriers supporting the same.

In one instance, the embodiments described herein may be configured to acquire objects, e.g., packages, parcels, or carriers supporting the same, from a source, such as an intermediate transport, e.g., a package car or mobile trailer.

In another instance, the embodiments described herein may be configured to segregate objects during transport, e.g., allowing the objects to be selectively sorted, stored, acquired, transported, and/or deposited, e.g., at corresponding delivery locations or points in transit to the same.

In another instance, the embodiments described herein may be configured to secure and protect objects during transit, e.g., reducing or limiting damage to the objects or contents therein caused by physical impact, weather including extreme temperatures, theft, vandalism, or other hazards, including potentially harmful movements initiated by an associated mobile robotic platform.

In another instance, the embodiments described herein may be configured to release objects or carriers supporting the same, e.g., for delivery at a particular location and/or to a particular consignee, or for return to a source, in different aspects.

In another instance, the embodiments described herein may include object-manipulating or object-restraining mechanisms that allow for controlled release of objects that are being transported, e.g., based on identification of a designated consignee or based on arrival at a particular delivery location or return point, in different aspects.

The embodiments described herein may be used individually and/or in different combinations to facilitate acquiring an object, constraining and protecting the object during transport, and releasing/depositing the object at an appropriate time and/or location.

Figure 2C:
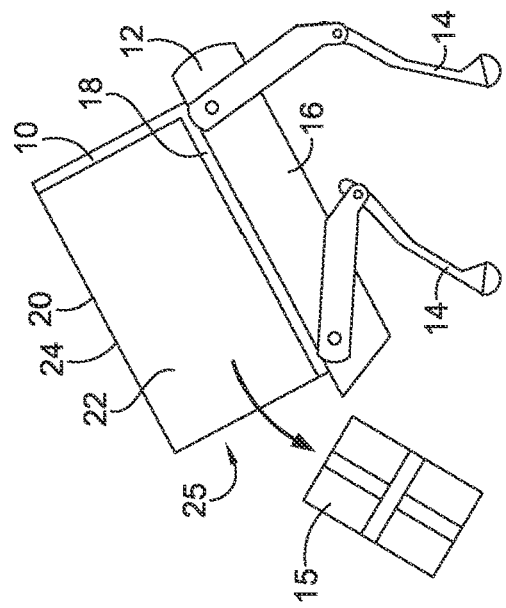
FIGS. 2A-2C depict a storage receptacle and a mobile robotic platform, in accordance with an embodiment hereof.
Figure 2B:
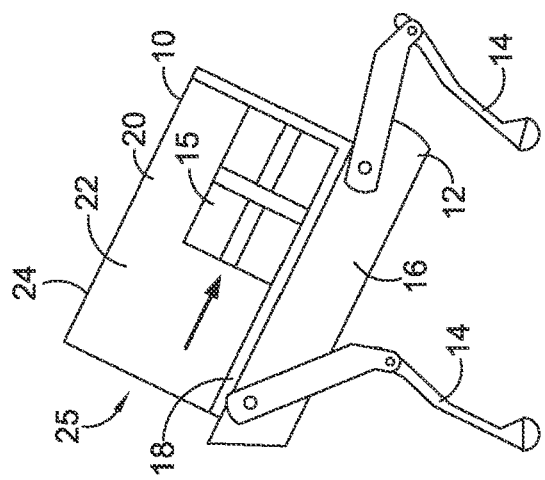
Figure 2A:
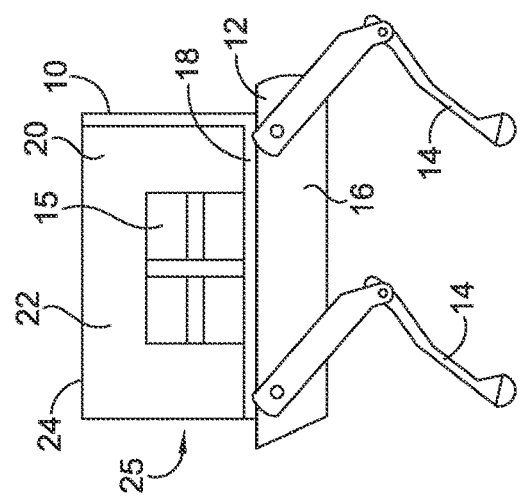

Looking now at FIGS. 2A-2C, a storage receptacle 10 and a mobile robotic platform 12 are shown, in accordance with embodiments hereof. The mobile robotic platform 12 can be used to transport objects deposited into the storage receptacle 10. The mobile robotic platform 12 includes a plurality of legs 14. The plurality of legs 14 are movably coupled to a body 16 of the mobile robotic platform 12. The legs 14 may allow the mobile robotic platform 12 to walk, change height, tilt, and/or perform other movements, e.g., for transiting, or for releasing objects. The storage receptacle 10 includes a base 18 and a plurality of walls 20 that extend from the base 18. In FIGS. 2A-2C, one of the walls 20 is omitted to show a storage space 22 located inside the storage receptacle 10 where an object, e.g., in this instance a parcel 15, is positioned. The storage receptacle 10 also includes an opening 24 located opposite to the base 18. The opening 24 allows objects, e.g., the parcel 15, to be deposited or removed from the storage space 22. In addition, the walls 20 define an opening 25 which allows the parcel 15 to be ejected from the storage space 22 when the mobile robotic platform 12 tilts forward, e.g., generally toward the opening 25, as shown in FIG. 2C. In additional embodiments, the storage receptacle 10 may include features that facilitate loading and/or unloading of objects, such as doors, opening/closing mechanisms, securing elements, and the like.

In different embodiments, a storage receptacle, e.g., the storage receptacle 10, may be a box, a crate, or another enclosure or semi-enclosure, including one that is rigid, non-rigid, or semi-rigid, e.g., by including some flexible, adjustable, and/or expandable sections. For example, in one instance, the storage receptacle may be an open-top box, e.g., one that is five-sided, which allows packages to be loaded and removed through an opening in the box. The box may also include four or fewer sides, such that an object, e.g., a package or parcel, remains within the perimeter of the box during transit, but then a change in disposition, configuration, and/or orientation allows the object to be released when the overall delivery system reaches its destination. For example, a four-sided box may be tilted toward an interior side wall, e.g., backward, to restraint an object, and then may be tilted toward an opening in the side walls, e.g., forward, to release or discharge the object. The storage receptacles described herein may differ in shape, size, configuration, number of walls, number of openings, and/or features utilized (e.g., dividers, object-retaining mechanisms, object-shifting mechanisms, and/or object-ejecting mechanisms, among others) in different embodiments.

In one embodiment, a storage receptacle, e.g., a box, crate, or other enclosure, may include a door that allows a side of the box to be selectively opened and closed. The door may be slidable, pivotable, or otherwise shiftable between a closed configuration and an open configuration. The door may be manually operated, or may be mechanically operated, e.g., in automated or semi-automated fashion, e.g., at the direction of a computing device. For example, the combined storage receptacle 10 and mobile robotic platform 12 shown in FIGS. 2A-2C may operate in at least partially automated fashion to perform the above-described operations. In another embodiment, the storage receptacle may be a box that includes one or more compartments that allow objects, e.g., parcels or packages, to be transported with distinct separation, and released individually. For example, the box may be partitioned using static dividers. The box may also be partitioned using adjustable dividers, e.g., as described herein in connection with FIGS. 3A-3C. The adjustable dividers may be extendable dividers, foldable dividers, pivoting dividers, inflatable dividers, expandable dividers, or other dividing elements that provide partitioning within a space. These elements may be adjusted manually, or mechanically, e.g., at the direction of a computing device, in different aspects.

The storage systems and storage receptacles described herein may further incorporate one or more doors, hatches, and/or other restraining or releasing mechanisms that allow one or more objects stored in the partitioned storage areas or compartments to be loaded and/or released individually. For example, there may be one door that provides access per compartment. In addition, a package-restraint mechanism may be associated with each compartment. The package-restraint mechanism(s) may operate to secure objects inside the compartments and/or to facilitate loading and unloading at desired times. The package-restraint mechanism(s) may include latches, male-female couplings, magnets, or other elements that allow for releasable attachment.

Figure 3A:
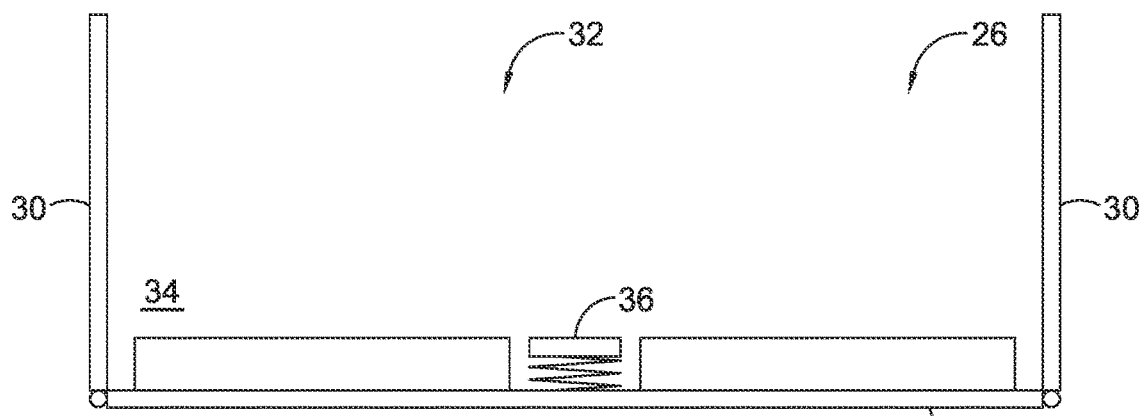
FIGS. 3A-3C depict an example storage receptacle used for transporting objects, in accordance with an embodiment hereof.
Figure 3B:
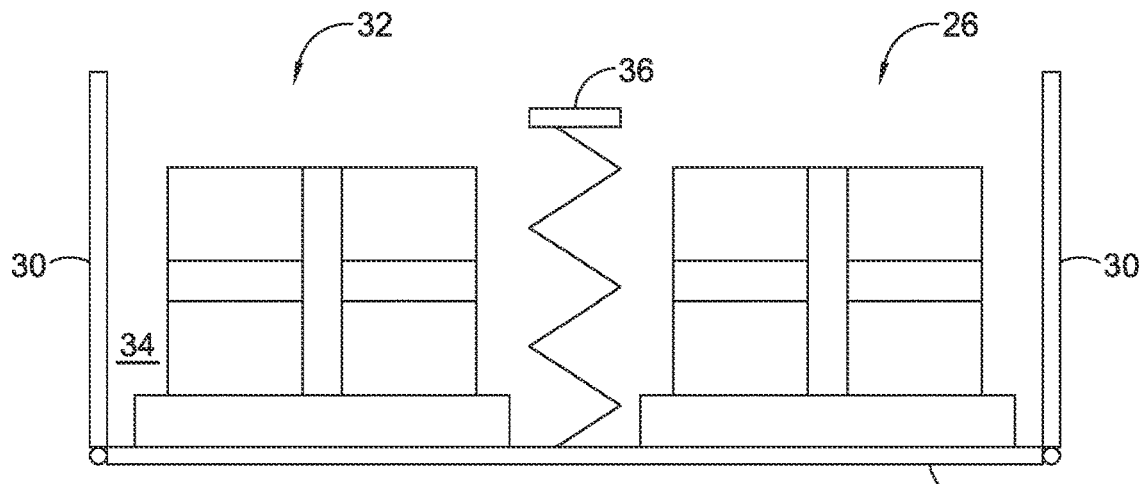
Figure 3C:
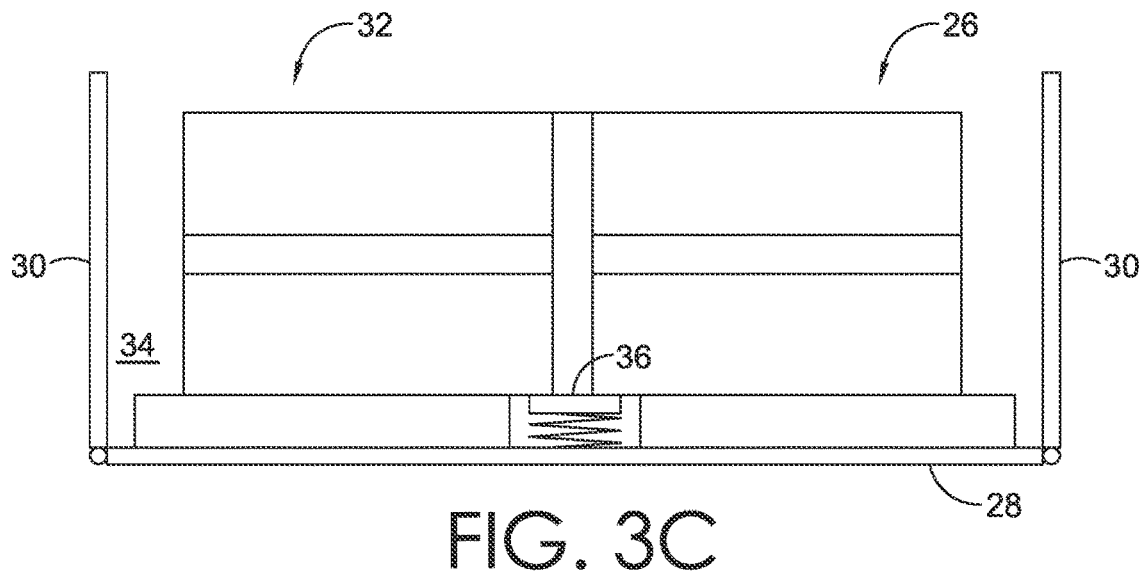

Looking now at FIGS. 3A-3C, a storage system 26 is shown, in accordance with an embodiment hereof. FIGS. 3A-3C, in particular, represent a cross-section showing the interior of the storage system 26. The storage system 26 may be used with a mobile robotic platform as described herein, among other uses. For example, in one embodiment, the storage system 26 might be used with the mobile robotic platform 12 shown in FIGS. 2A-2C. The storage system 26 includes a base 28 and a plurality of walls 30 that extend from the base 28. The base 28 and the plurality of walls 30 generally define an opening 32 into a storage space 34 within the storage system 26. The opening 32 is located generally opposite to the base 28. The storage space 34 is designed to receive objects, e.g., parcels, as shown in FIGS. 3B and 3C.

Looking still at FIGS. 3A-3C, the storage system 26 further includes a divider 36 positioned in the storage space 34. The divider 36 is coupled to the base 28. In the depicted embodiment, the divider 36 is extendable and retractable. This allows the divider 36 to be extended toward the opening 32, partitioning multiple storage areas within the storage space 34, or to be retracted toward the base 28, thereby reducing or eliminating the partitioning within the storage space 34, e.g., to allow for storage of larger objects. In different embodiments, one or multiple dividers, of any type described herein, may be used in a storage system. For example, the storage system 26 might use 1, 2, 3, 4, or more dividers, allowing different areas of the storage space 34 to be partitioned, e.g., to accommodate objects of different sizes and shapes. The divider 36 may include a biasing element, e.g., a spring, an elastic member, or another biasing mechanism, that biases the divider 36 toward the opening 32. FIGS. 3A and 3C show the storage system 26 with the divider 36 retracted toward the base 28. This configuration allows larger objects to be placed in the storage system 26, e.g., as shown in FIG. 3C. Looking at FIG. 3B, the divider 36 is extended. This partitions the storage space 34 into multiple storage areas. This allows multiple objects to be enclosed separately, as shown in FIG. 3B.

The dividers that may be used in a storage system, e.g., the storage system 26 shown in FIGS. 3A-3C, may vary in design and implementation. For example, one type of divider might be a panel or a series of panels that extend from and/or rotate out from a base and/or sidewalls of a storage enclosure, e.g., by pivoting about one or more hinges. In another example, the divider might be a flexible panel or a series of flexible panels that fold into different configurations. In another example, the divider might be a panel or a series of panels that inflate or otherwise expand into a larger volume. In yet another example, the divider might be some form of telescoping or extensible mechanism, being extendable either mechanically, electrically, pneumatically, or by another principle. Finally, one or more movable or repositionable dividers may be utilized in a storage system, e.g., in a box or crate, to enable adaptable partitioning. In any of these instances, the motion of the divider(s) may be automatic, semi-automatic, and/or may be controlled with one or more actuators and/or controllers. This may support automated or semi-automated partitioning during an automated loading or unloading process.

Figure 4:
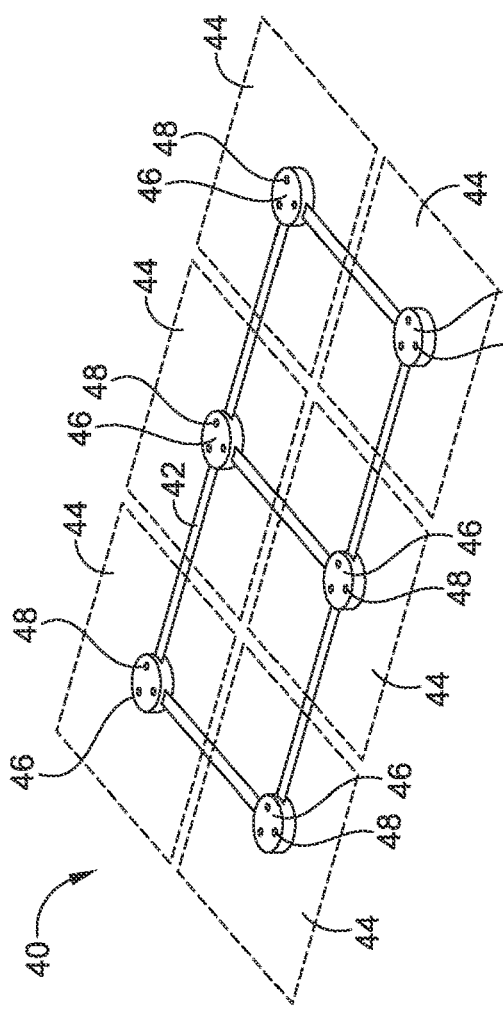
FIG. 4 depicts an example system for transporting objects, in accordance with an embodiment hereof.
Figure 9A:
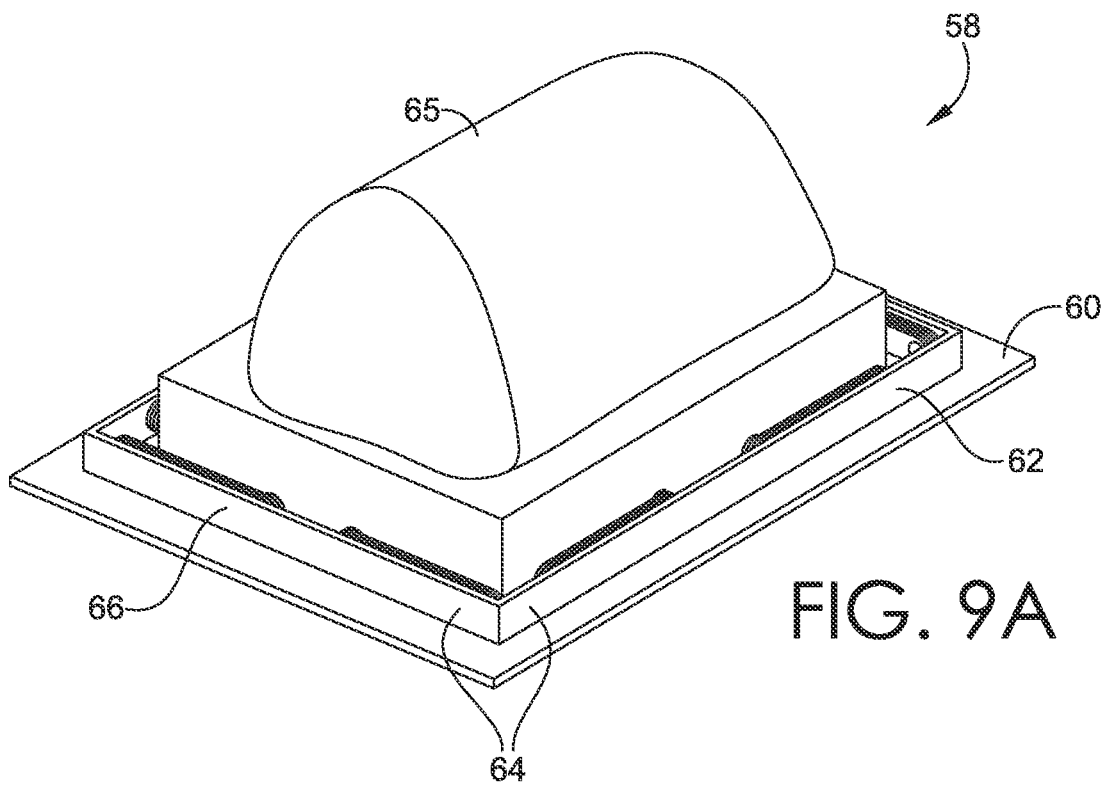
FIGS. 9A-9B depict another carrier for transporting objects, in accordance with an embodiment hereof.
Figure 9B:
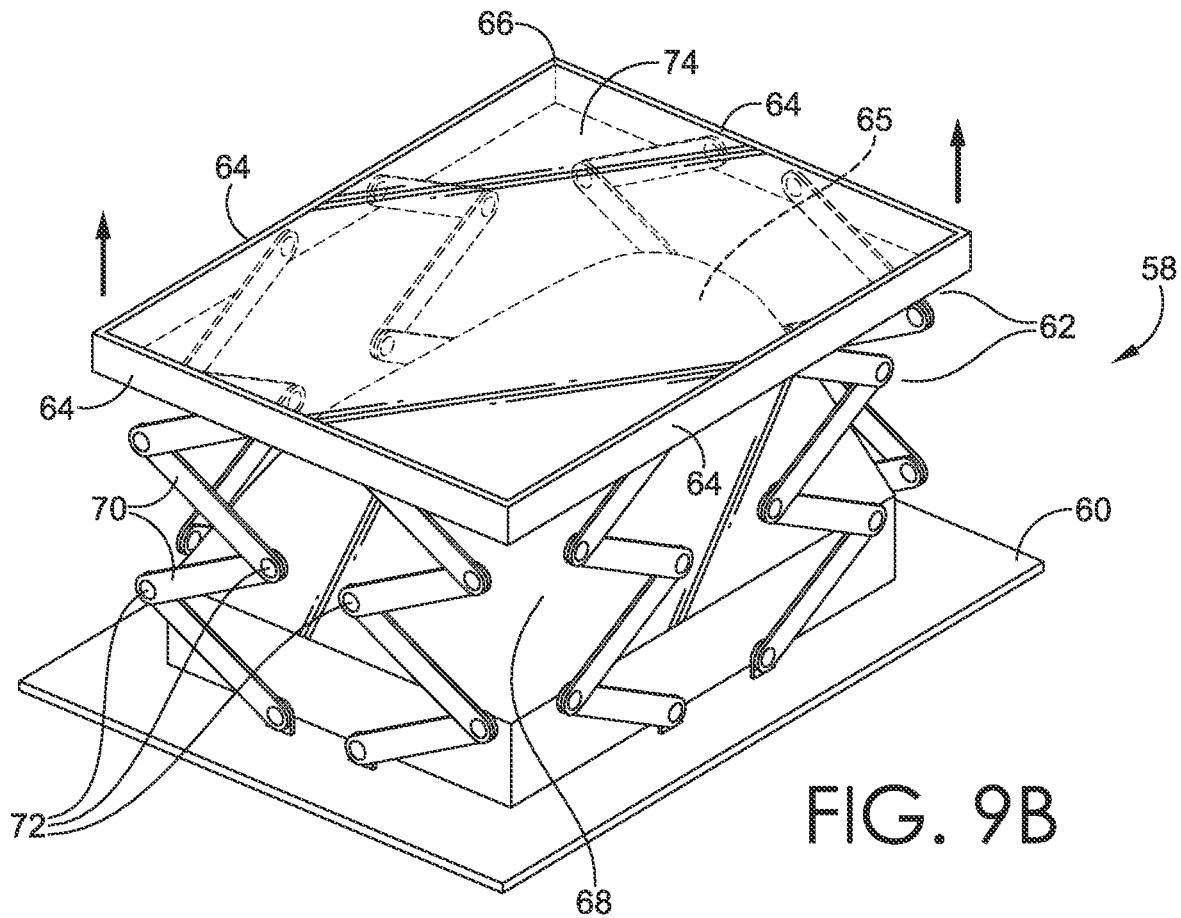

Looking now at FIG. 4, a system 40 for transporting multiple objects is shown, in accordance with an embodiment hereof. The system 40 includes a frame 42 and a plurality of pallets 44 coupled to the frame 42. The pallets 44 are coupled to the frame 42 at a plurality of connection points 46. In addition, located at each connection point 46 is a mechanical coupling 48, or rather, a first element of the mechanical coupling 48 that couples to a corresponding second element of the mechanical coupling 48 located on a carrier used to transport objects (e.g., as shown in FIGS. 9A-9B). The system 40 allows carriers supporting and/or enclosing objects to be individually coupled to the pallets 44, and then transported together. In different aspects, the mechanical couplings used to secure the carriers onto the pallets may include clamping mechanisms, latching mechanisms, magnetic mechanisms, male-female attachments, and/or other configurations.

In one embodiment, a series of pallets may be used to secure and transport objects. The pallets may be used with a mobile robotic platform or other transport mechanism, e.g., through being mounted on a frame thereof. The pallets may provide a modular system capable of receiving, restraining, and/or securing objects, e.g., parcels or packages, individually during transport. This may be of particular benefit when utilized with an automated storage and retrieval system ("ASRS"), and/or with last-distance delivery robots, e.g., air and land-based drones, among other systems.

In another embodiment, a palletized system is used to secure and transport objects. The palletized system can be used to transport objects that are secured to carriers that are individually attachable to the palletized system. FIGS. 9A-9B and FIGS. 9C-9D represent non-limiting examples of such carriers. In additional embodiments, the objects, e.g., parcels or packages, themselves may be attachable directly to the palletized system using different methods. The carriers may be configured to rigidly and/or reversibly attach to a pallet, or in one instance, to a rigid sub-frame of a pallet. This attachment may be provided through use of a quick-release mechanism. In one embodiment, the quick-release mechanism may be a quasi-kinematic coupling, e.g., a cam-locking quick-release mechanism, e.g., one that includes an active portion and a passive portion. One example of this is shown generally in FIGS. 6-8. The rigid sub-frame of a pallet, e.g., the frame 42 shown in FIG. 4, may include, and transport, the active portion of the quick-release mechanism, while each carrier or object coupled to the rigid sub-frame may include, and transport, the passive portion of the quick-release mechanism. The rigid sub-frame may provide power and control signals to the active portion of the quick-release mechanism (e.g., the portion of the mechanical coupling 48 shown in FIG. 4). The passive portion of the quick-release mechanism may be coupled to each individual carrier or may be located directly on an object, and may be rigidly, and/or reversibly, attached using different methods.

In one embodiment, a quick-release mechanism, e.g., a passive portion thereof, may be manufactured from a disposable or recyclable material. The methods of coupling or affixing such passive portions of a quick-release mechanism to a carrier may vary. One example is shown generally in FIGS. 6-8. In some aspects, the passive portion may be implemented by forming receiver slots for a cam-locking quick-release mechanism in a recyclable cardboard, rigid paper, or other natural material. The natural material, e.g., cardboard, may further be formed to create a structure that can expand, i.e., accordion around, a carrier or object to provide a protective enclosure, or even to provide an impact-resistant "cage." One such example is shown in FIGS. 9C-9D. The carriers or objects can then be rigidly, and/or reversibly, attached to a pallet for transport to a particular location.

Figure 5E:
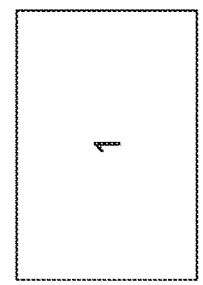
FIGS. 5A-5E depict different configurations of pallets useable for transporting objects, in accordance with embodiments hereof.

The palletized systems described herein may further be configured to accommodate and secure objects and carriers of different sizes. One example of this is shown in FIGS. 4-5E. For example, in one instance, a plurality of pallets having discrete, integer-multiple length and width dimensions may be used with a rigid sub-frame. The location of quick-release mounting points on the rigid sub-frame may be designed to match this discrete, integer-multiple system. For example, a rigid sub-frame may be designed to have a 2×3 grid of quick-release mounting points. This grid can then carry six "1×1" pallets, three "1×2" pallets, two "1×3" pallets, or one "2×3" pallet. In addition, many other arrangements with different numbers of quick-release points, in different organizational schemes, are contemplated herein. This palletized system provides the additional benefit of facilitating object handling by automated systems, such as ASRS systems. Using such palletized systems, the variable, unpredictable geometry of an object, e.g., a parcel or package being transported, may be replaced by the consistent, known geometry of a pallet and its quick-release mounting points. The aforementioned ASRS systems may be used to handle such pallets having known geometries and configurations with greater efficiency and precision.

The carriers described herein for securing and transporting objects may be rigid, reversible, and/or adjustable. In the case of packages or parcels being delivered, the rigid restraint of such packages and parcels can be beneficial, e.g., by maintaining package care standards, providing predictable package pose for loading, selection, and release, providing operational stability to or for the systems that are manipulating the package (e.g., a heavy package rolling around inside a package carrier may cause unstable behavior in an autonomous system that is transporting the package, and the carrier being designed to secure the package may reduce this instability). This restraint of the package may also be reversible, as this enables the package to be released at a desired delivery point, and to maintain package care standards (e.g., limiting or reducing damage through controlled movement/shifting). Techniques that can be used to rigidly and/or reversibly attach objects, e.g., packages, parcels, and the like, including those with unfixed geometries, to a carrier or other transport structure include, but are not limited to, the use of non-residuing adhesives, such as tapes; the use of polymer films such as Low-density Polyethylene ("LDPE") or Polyvinyl Chloride ("PVC") films (or other forms of stretchable wrapping material); the use of airbags which can be inflated around an object to constrain its motion; the use of jammable granular-material grippers, which can be evacuated of air after a package is loaded inside; and/or use of electrostatic gripping pads or devices.

The rigid or semi-rigid attachment of an object, e.g., package or parcel, to a carrier may also limit or reduce the need to estimate the inertia tensor of the object, and/or may facilitate the estimation of the combined inertia tensor of the object and carrier. For example, for certain "last-distance" delivery systems (e.g., those that generally transport objects the final distance to a delivery destination or designated consignee), the performance and stability of the delivery system can be significantly impacted by the accuracy of its internal physical model of the system and the payload. If an object is rigidly coupled to a carrier, the inertia tensor of the object (or, more accurately, the change in inertia tensor of the payload) may be estimated through different methods. For example, these may include static measurement of the weight of the package carrier at a single point (to measure change in mass which may be acceptable for first-order approximation); static measurement of the weight of the package carrier at multiple points (to provide an estimate of the center of mass of the payload in an X-Y plane); and/or dynamic measurement of inertia tensor using a perturbation method.

The delivery systems described herein may also incorporate features that allow objects to be individually released at selected destinations or to selected recipients. This selective release may be accomplished through different methods and/or through use of different mechanisms or devices. For example, a door or latchable panel may be located on an object carrier and used to release an object at a desired destination; a package-restraint technique, e.g., the airbag described above, may be used to release an object at a desired destination; and/or an active-release mechanism, such as a spring, solenoid, and/or linear actuator that ejects an object from a carrier, may be used to control release. In addition, when the object is a package being delivered to a particular consignee by a logistics carrier, it may also be necessary to identify the recipient before releasing the package.

The delivery of sensitive or controlled objects, e.g., pharmaceuticals, sensitive documents, high-value items, and the like, may be provided with additional verification, authentication, and/or secured release. For example, during final delivery of sensitive or controlled objects, e.g., controlled medicines, a consignee may need to provide valid photo identification before delivery can be completed. In such instances, a transport system, e.g., mobile robotic platform, may be provided with a device for validating such identification. This device may be a camera, scanner, RFID reader, input device, and/or processor, among other components. In one embodiment, the device includes a user-interface useable to communicate with the consignee. The device may also secure the object within the carrier, and release it only once a consignee is identified.

Figure 5D:
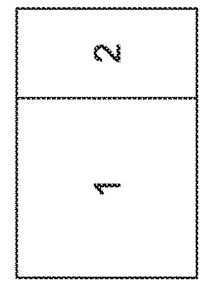
Figure 5C:
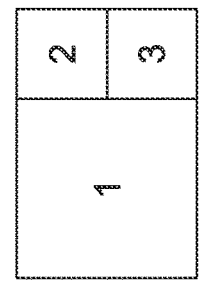
Figure 5B:
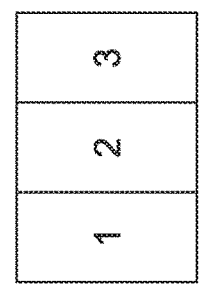
Figure 5A:
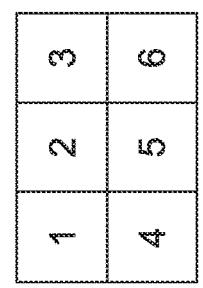

Looking now at FIGS. 5A-5E, a series of pallet configurations are shown, in accordance with embodiments hereof. The pallets and associated pallet-based systems may be used with a system for transporting objects, e.g., the system 40 shown in FIG. 4. FIGS. 5A-5E show pallets of different sizes and shapes, and different combinations of pallets, which may be used to increase the adaptability of a storage system, e.g., like the system 40 shown in FIG. 4. FIG. 5A depicts a plurality of pallets of the same size, e.g., which may be mounted on a frame, e.g., a rigid sub-frame. FIG. 5B depicts a similar configuration but with fewer pallets of a larger size. FIGS. 5C and 5D depict configurations with pallets of different sizes (e.g., suitable for accommodating carriers and objects of different sizes). FIG. 5E depicts a configuration with only one pallet coupled to a frame, e.g., for accommodating a carrier and/or object of a largest possible size. In each configuration shown in FIGS. 5A-5E, a corresponding mechanical coupling may be provided for each pallet for use in coupling an object or object carrier thereto.

Figure 6:
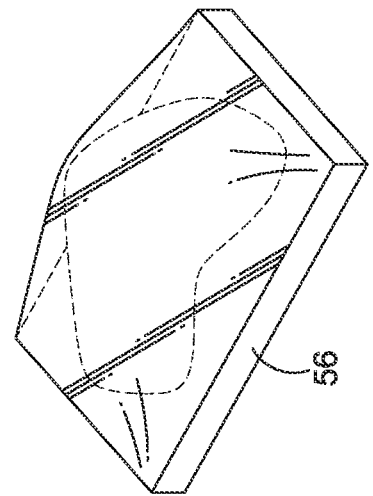
FIG. 6 depicts one example of a mechanical coupling, in accordance with an embodiment hereof.
Figure 7:
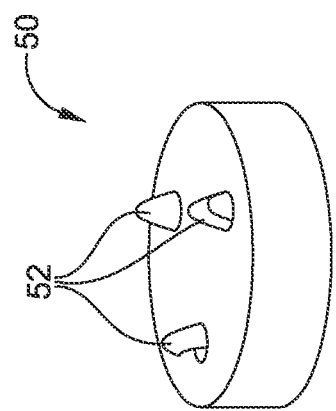
FIG. 7 depicts an example of a carrier for transporting objects, in accordance with an embodiment hereof.
Figure 8:
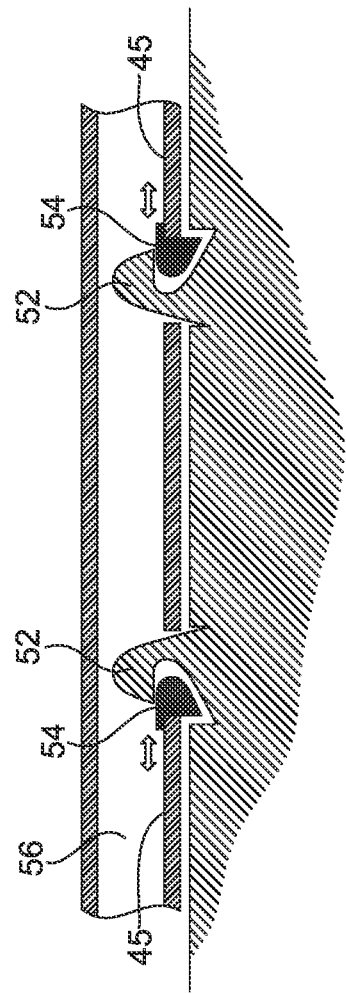
FIG. 8 depicts a cross-section of the mechanical coupling of FIG. 6 and the carrier of FIG. 7 when coupled together, in accordance with an embodiment hereof.
Figure 9C:
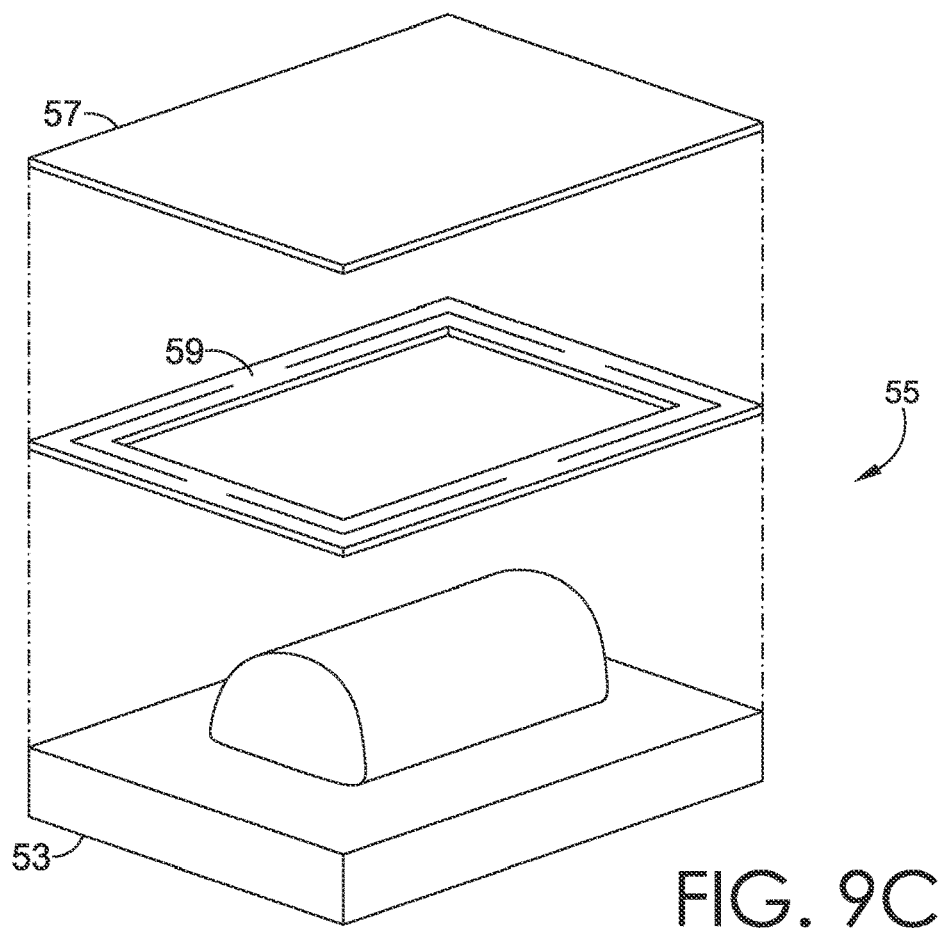
FIGS. 9C-9D depict another carrier for transporting objects, in accordance with an embodiment hereof.
Figure 9D:
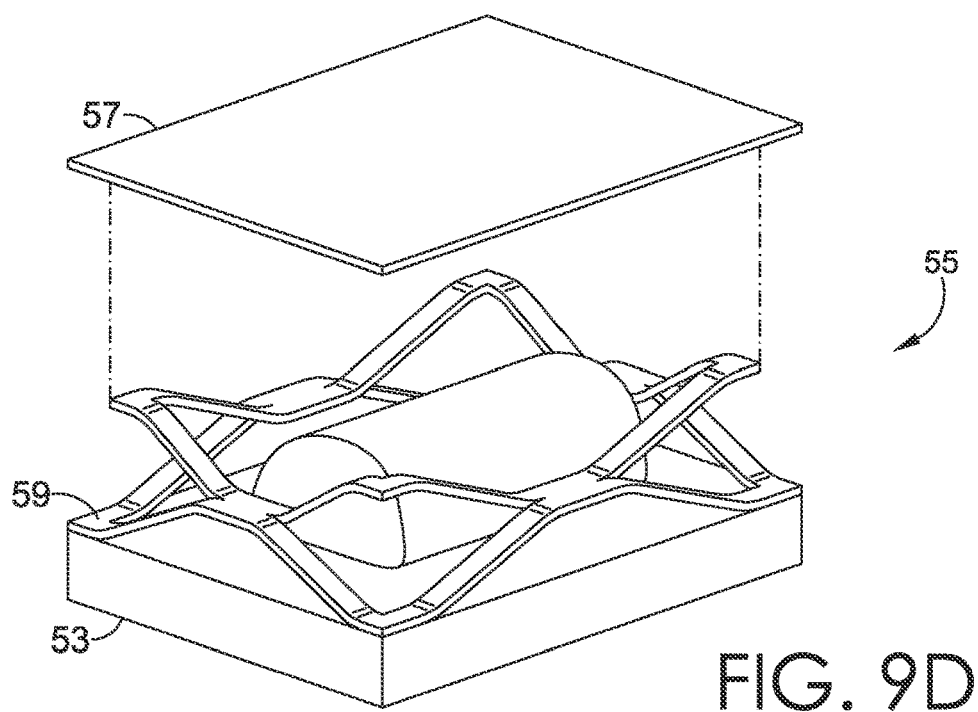

Looking now at FIGS. 6-8, a configuration suitable for releasably securing a carrier to a mechanical coupling, e.g., one located on a pallet-type transport system, is shown, in accordance with an embodiment hereof. FIG. 6 in particular depicts an example mechanical coupling 50. FIG. 8 depicts a partial cross-section view of the mechanical coupling 50 engaging and being releasably secured to a carrier 56. The mechanical coupling 50 includes a plurality of elements 52, e.g., protrusions or studs, and a plurality of elements 54 located partially within the plurality of elements 52. The plurality of elements 54 are each shiftable between a retracted position and an extended position, the latter of which is shown in FIG. 8. The mechanical coupling 50 is represented in FIGS. 6 and 8 as a latching-type mechanism, but other mechanical, electrical, and/or magnetic couplings are contemplated as alternatives.

FIG. 7 depicts a carrier 56 that is used for securing and transporting objects. FIG. 8 further shows the carrier 56 seated on the mechanical coupling 50, with the elements 54 extended to releasably engage a structure 45 of the carrier 56. In this instance, the bottom of the carrier 56 may include a plate or sheet with holes matching the location of the elements 52, 54. In the "unsecured" state, the elements 54 are retracted at least partially inside the elements 52. The carrier 56 can then be dropped down onto the mechanical coupling 50, with the holes on the bottom of the carrier 56 aligning with, and receiving, the elements 52, 54. The location of the plurality of elements 52 helps facilitate a specific positioning of the carrier 56 relative to the mechanical coupling 50, while accommodating a relatively lower accuracy in positioning initially, e.g., during initial alignment. Once the carrier 56 is mounted on the mechanical coupling 50, a mechanism inside the mechanical coupling 50 may be actuated to extend the plurality of elements 54, and engage the carrier 56, e.g., as shown in FIG. 8, for secure transport. In one aspect, the mechanical coupling 50 may represent one of a plurality of mechanical couplings located on a palletized system used for transporting multiple carriers and/or multiple objects. In an additional aspect, an object, e.g., parcel or package, may also include a feature that allows the elements 52, 54 of the mechanical coupling 50 to engage the object itself, instead of a carrier holding the object. Both aspects are contemplated herein.

In one embodiment, multiple carriers supporting objects may be attached to a palletized system, e.g., using individualized or collective couplings, which is then transported by a mobile robotic platform to a particular destination, e.g., in automated or semi-automated fashion. In one embodiment, the palletized system may be detachable from the mobile robotic platform, allowing the mobile robotic platform to be reconfigured. In further embodiments, the carriers used with the palletized system may be tote-style carriers. For example, the tote-style carriers may be pre-loaded, e.g., manually or automatically, with one or more objects, e.g., parcels or packages, intended for delivery to a destination. Then, the tote-style carriers with the objects secured therein may be loaded onto a mobile robotic platform, e.g., on a palletized system, instead of loading individual objects, e.g., parcels or packages.

The use of standardized, reversibly attachable carriers may provide a number of advantages. For example, a standardized tote, bag, or other carrier structure (or, similarly, pallets of a certain range of standardized sizes) can be used to provide a more consistent size and construction, allowing for easier handling/loading by automated or semi-automated handling systems, such as an ASRS, e.g., those installed in a vehicle. In addition, through use of these embodiments, loads with specialized transport requirements can be accommodated. For example, medicines or other objects that require special temperature control may be enclosed in specially designed bags, totes, or other carrier structures that are then transported by a mobile robotic platform. This allows for such transport without permanently re-configuring a mobile robotic platform for such an application, when the mobile robotic platform may otherwise be used or needed for other types of transport operations. In addition, since the carrier, e.g., bag, tote, or other carrier structure, is discrete and separable from the mobile robotic platform, a failure of components associated with the carrier might not necessarily impact the mobile robotic platform, because the carrier can then be detached and replaced.

Looking now at FIGS. 9A and 9B, another carrier 58 used for transporting objects is shown, in accordance with an embodiment hereof. The carrier 58 includes a base 60 and a movable enclosure 62 that is coupled to the base 60. The movable enclosure 62 extends to a plurality of outer edges 64. The plurality of outer edges 64 extend circumferentially thereby forming a frame 66. The movable enclosure 62 is adjustable between a first configuration, e.g., as shown in FIG. 9A, and a second configuration, e.g., as shown in FIG. 9B. In the first configuration, the frame 66 is retracted such that the plurality of outer edges 64, or rather the frame 66, abuts, or is adjacent to, the base 60. This allows an object 65 to be more easily loaded onto the carrier 58. In the second configuration, the frame 66 is extended such that the plurality of outer edges 64, or rather the frame 66, are spaced from the base 60, forming an enclosure that surrounds a storage space 68 where the object 65 is located. In addition, as shown in FIGS. 9A and 9B, the movable enclosure 62 has a lattice structure 70 connected by a plurality of hinges 72. These components allow the frame 66 to extend and retract relative to the base 60. FIG. 9B also shows a cover 74 placed over an opening into the storage space 68.

Looking now at FIGS. 9C-9D, another carrier 55 used for transporting objects is shown, in accordance with an embodiment hereof. The carrier 55 shown in FIGS. 9C-9D has a different construction than the carrier 58 shown in FIGS. 9A-9B. In this particular aspect, the carrier 55 is formed at least partially from disposable and/or recyclable materials, e.g., cardboard, paper products, bamboo, and/or other natural materials.

The carrier 55 shown in FIGS. 9C and 9D includes a first sheet or board of material 53 and a second sheet or board of material 57. The sheets or boards of material 53, 57 may be cardboard, polymer film, laminate, paper products, and/or other natural or synthetic materials that provide a minimum degree of stiffness or rigidity. In this respect, the stiffness or rigidity of the sheets or boards of material 53, 57 may vary based on the materials used, and the desired performance characteristics. The carrier 55 further includes an expandable frame 59. The expandable frame 59 is designed, e.g., cut, assembled, or otherwise formed, to be adjustable, e.g., expandable/retractable. FIG. 9C shows the frame 59 prior to being cut, and FIG. 9D shows the frame 59 cut into the adjustable shape, with its corners attached to the sheets or boards of material 53, 57. The frame 59 is shown in FIGS. 9C and 9D being formed into one possible shape, e.g., a rectangle, among many other possible shapes and sizes. The attachment of the frame 59 to the sheets or boards of material 53, 57 is such that the frame 59 can be stretched to enclose an object in the carrier 55. This allows the object to be at least partially constrained and protected during transport. In the depicted embodiment, the expandable frame 59 is a sheet of cardboard that includes cuts along the legs, which allow it to expand in a web-like configuration. In additional embodiments, the number and spacing of cuts may be increased or decreased, to form a desired number of layers in the frame 59.

To transport an object using the carrier 55, the following process may be used. First, an object may be placed on the sheet or board of material 53. Then, or prior, the frame 59, having been cut into the expandable pattern, is attached to the sheet or board of material 53, e.g., using an adhesive, fasteners, or using another securement method. The frame 59 is then expanded around the object, and attached to the sheet or board of material 57, thereby at least partially enclosing and protecting the object with a configuration that can be re-used, recycled, and/or reconfigured, depending on the materials used, and the construction, in different aspects. In an alternative embodiment, the attachment of the expandable frame 59 may occur in the reverse, starting with the sheet or board of material 57.

Figure 10:
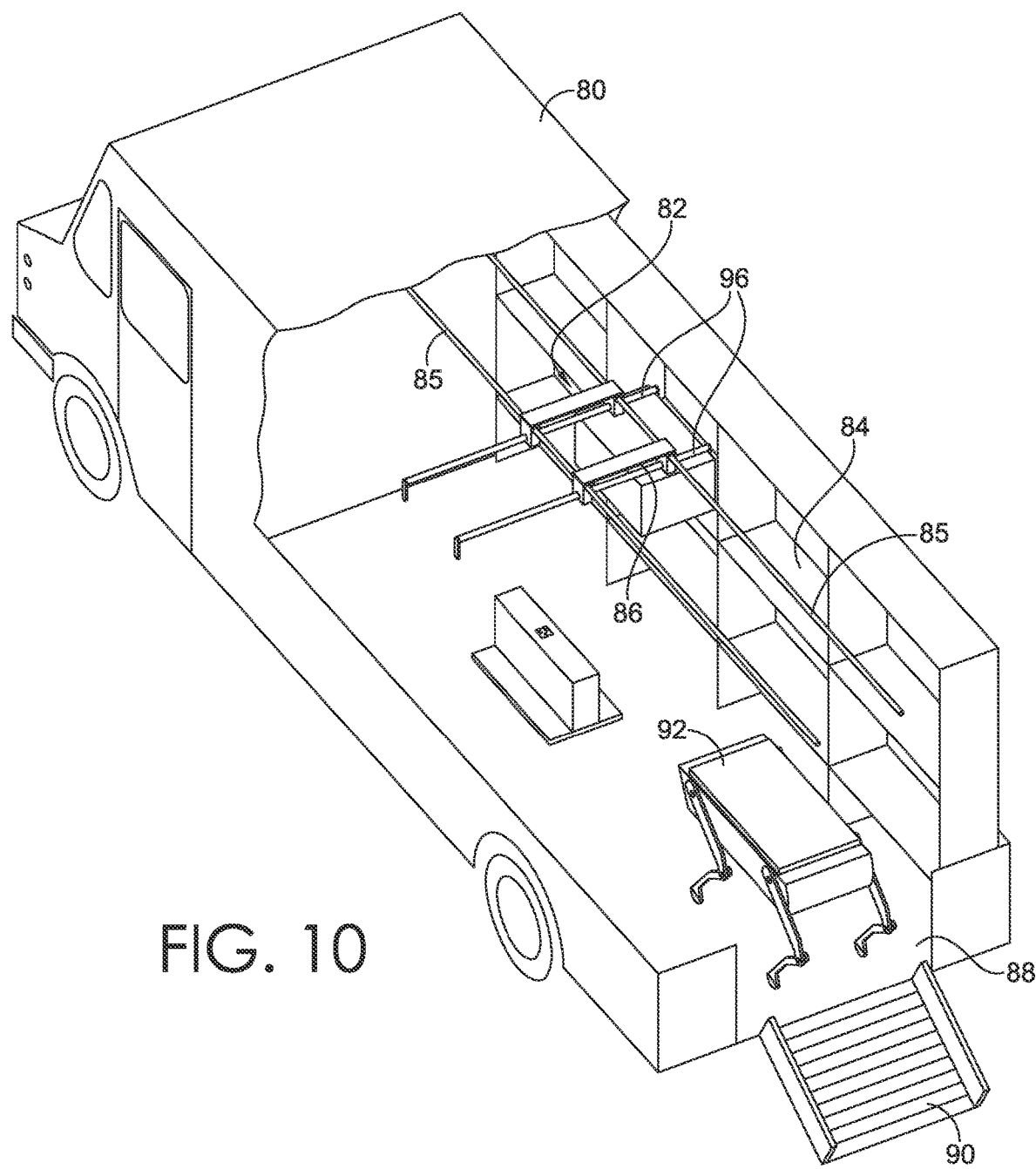
FIG. 10 depicts a vehicle with an object-loading system incorporated therein, in accordance with an embodiment hereof.

Looking now at FIG. 10, a vehicle 80 that includes a system 82 for loading and/or unloading objects in automated or semi-automated fashion is shown, in accordance with an embodiment hereof. The system 82 may be an ASRS, in one aspect. The system 82 is generally integrated within the vehicle 80. The system 82 includes a shuttle mechanism 86. The shuttle mechanism 86 is shiftable along a track 85 to different positions in the vehicle 80, e.g., to facilitate transferring, loading, and/or unloading objects. The shuttle mechanism 86 is additionally adjustable between a lowered position and a raised position to enable further access to objects. The shuttle mechanism 86 also includes an object-engaging mechanism 96. The object-engaging mechanism 96 is used to engage and shift objects inside the vehicle 80, e.g., parcels being routed to different destinations. To facilitate such shifting, the object-engaging mechanism 96 can include movable elements (e.g., arms, claws, pads, or the like) that allow it to engage and shift objects, e.g., packages or parcels of different sizes. The movable elements may be coupled to actuators that are controlled by a computing device.

In one instance, the object-engaging mechanism 96 may be used to engage and shift objects to/from a plurality of storage units 84 located inside the vehicle 80, e.g., as part of a last-distance delivery operation. During a loading operation, the shuttle mechanism 86 and the object-engaging mechanism 96 may operate in coordination to engage and shift objects from the plurality of storage units 84 and transfer them toward a loading surface 88. The loading surface 88 is configured to support a mobile robotic platform 92, and is connected to a ramp 90. The ramp 90 is adjustable between a lowered position, e.g., as shown in FIG. 10, and a raised position, e.g., suitable for transit of the vehicle 80.

When the ramp 90 is in the lowered position, the mobile robotic platform 92 can ascend the ramp 90, and position itself on the loading surface 88, or descend the ramp 90 while loaded with one or more objects. When the mobile robotic platform 92 is on the loading surface 88, e.g., as shown in FIG. 10, the shuttle mechanism 86 can then shift the object-engaging mechanism 96 to an object-specific location, retrieve an object from the plurality of storage units 84, and then deposit the object onto the mobile robotic platform 92, e.g., for subsequent transit to a delivery destination. In some embodiments, the mobile robotic platform 92 may include a storage system, e.g., similar to the system 40 shown in FIG. 4, configured to receive, retain, and release objects, and/or carriers containing the objects, in different aspects. Looking still at FIG. 10, the mobile robotic platform 92, once loaded with a desired number of objects, carriers with objects, and/or pallets with the same, can exit the vehicle 80 to perform a delivery operation, e.g., a last-distance or last-mile delivery operation, e.g., completing the transit of an object to a recipient through a logistics network.

In connection with the embodiments described herein, different techniques may be used for loading objects or carriers onto a mobile robotic platform, e.g., the platform 92 shown in FIG. 10. For example, a palletized system can be used to simplify the handling of multiple objects, e.g., packages or parcels, by an automated system, e.g., such as some form of ASRS. In some instances, an ASRS may be implemented inside a distribution center of a logistics network, inside a remote forward-storage location that is downstream in a logistics network, and/or inside a vehicle that transports objects for delivery in a logistics network, e.g., one that operates in connection with a last-distance delivery system, e.g., that uses the mobile robotic platforms and storage systems described herein. The use of an ASRS to load, transport, and release objects or carriers with objects in conjunction with a palletized system can further be enhanced by using a storage grid in the ASRS/palletized system. The storage grid may be designed so that it is reconfigurable, thereby allowing it to support each discrete sized pallet that is desired to be used in the palletized system, e.g., during a particular delivery operation. This adaptability in the ASRS/palletized system may be provided using different techniques, e.g., adjustable dividers, rollers, partitions, or other structures or mechanisms including those discussed herein. The dimensions of the ASRS/palletized system may also be selected to generally correspond to the dimensions of an object carrier sub-frame. For example, for a carrier sub-frame having six mounting points in a 2×3 configuration, the ASRS/palletized system (e.g., inside a vehicle) may be designed to have discrete bays, each of which can hold up to a 2×3 pallet (or any sub-division of smaller pallets).

In some embodiments, an ASRS may be loaded from a single point (e.g., a rear door of a vehicle). In other embodiments, an external covering may be lifted away to expose the ASRS, and the ASRS may be loaded from the outside, e.g., through a side of a vehicle. Loading a transport system in this manner provides a substantial benefit in loading speed, as multiple objects may be loaded simultaneously or in quick sequence, instead of one at a time through a single loading point. In the aforementioned instances, the loading may be performed manually, automatically, or semi-automatically, or through some combination of the same.

The shifting of pallets in connection with an ASRS/palletized system, e.g., inside a vehicle, may be performed using a shuttle, e.g., as described in connection with FIG. 10, or using an autonomous vehicle/apparatus capable of moving in multiple directions inside the ASRS, and capable of selecting an object, shifting the object, and releasing the object at a specified destination, e.g., on a mobile robotic platform that transports the object to a delivery destination. These shifting mechanisms may have different configurations. For example, in one embodiment, a shuttle may be used which has a fixed dimension. This allows it to engage a stored pallet, e.g., one supporting a plurality of objects and/or carriers with objects, by connecting to a quick-release feature located on the pallet (e.g., a latching mechanism or other coupling). In another embodiment, a shuttle is provided that includes multiple distinct, actuated parts, which can be displaced a variable distance from each other. This allows the distinct parts to align themselves with opposite ends of a pallet, regardless of the size of the pallet, and engage the pallet for further shifting.

Figure 11:
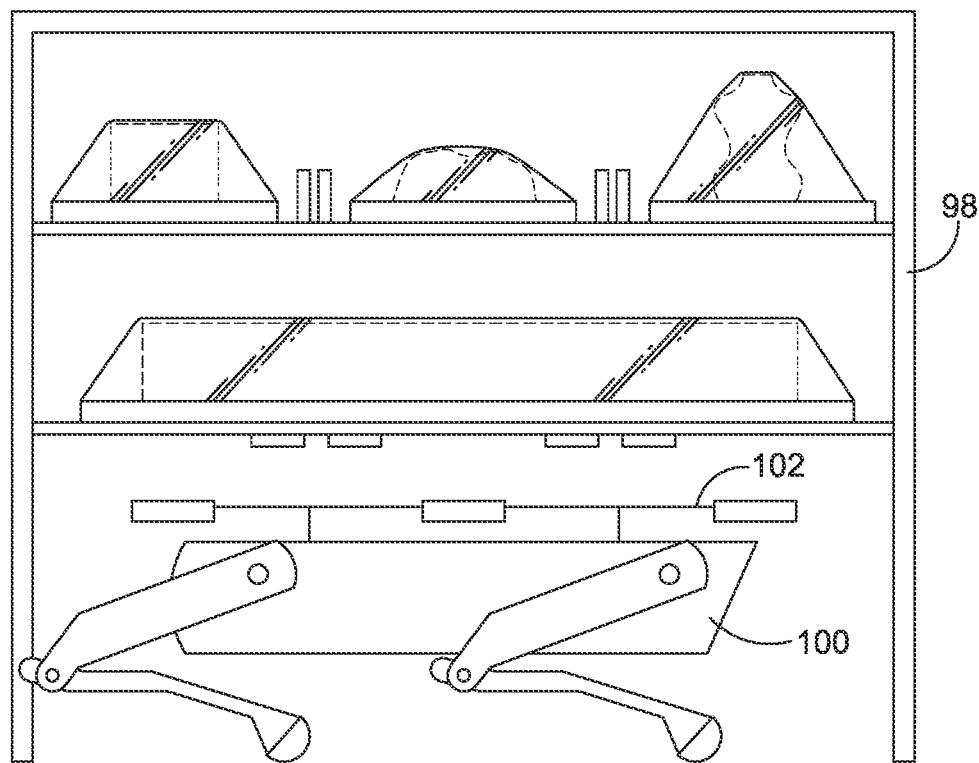
FIG. 11 depicts a mobile robotic platform adjacent to a storage unit, in accordance with an embodiment hereof.

Looking at FIG. 11, a plurality of storage units 98 and a mobile robotic platform 100 are shown, in accordance with an embodiment hereof. The storage units 98 may be located in a vehicle, such as the vehicle 80 shown in FIG. 10. In some aspects, a loading system, e.g., such as the system 82 described in connection with FIG. 10, may be used to engage and shift objects/carriers to or from the storage units 98 and/or to or from the mobile robotic platform 100. The mobile robotic platform 100 shown in FIG. 11 includes a storage system 102 for storing and transporting objects/carriers. The storage system 102 may include any of the features described herein, e.g., a frame, a plurality of pallets, mechanical couplings that allow carriers to be coupled to the pallets, and/or other features.

Figure 12A:
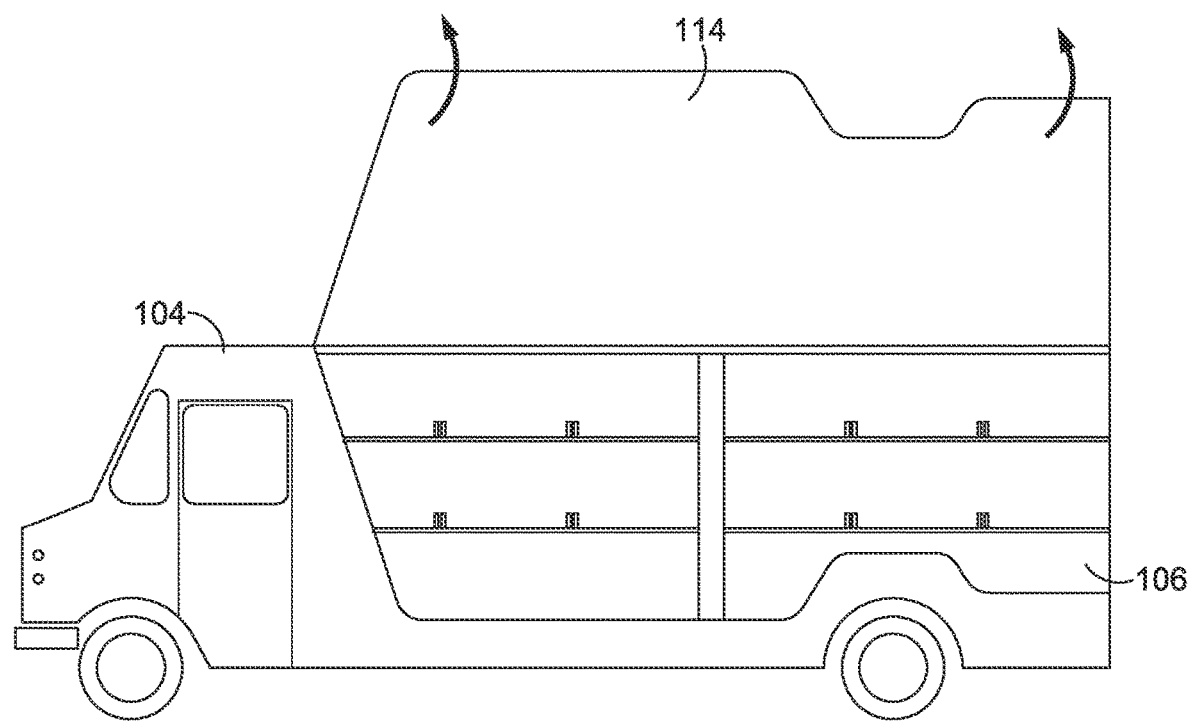
FIGS. 12A-12B depict a vehicle adapted for automated and/or semi-automated loading operations, in accordance with an embodiment hereof.
Figure 12B:
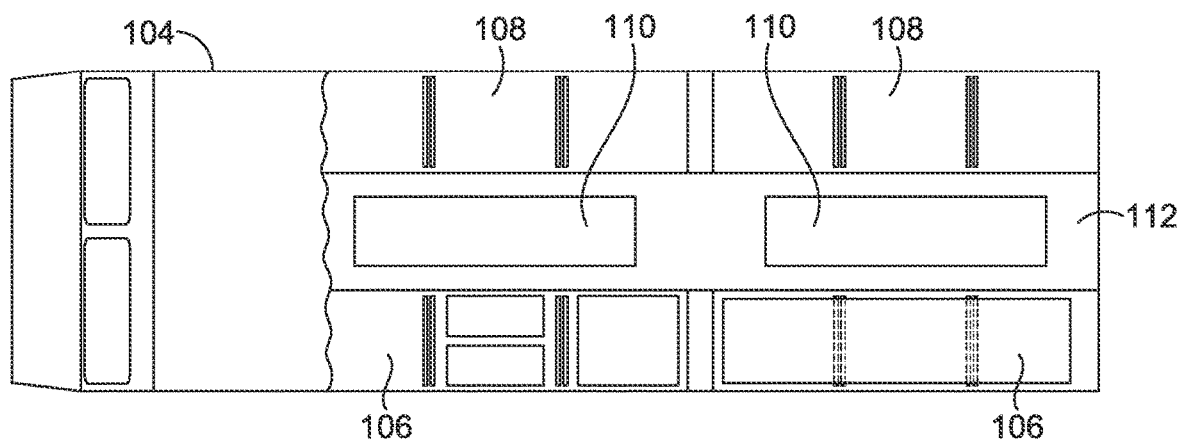

Looking at FIGS. 12A and 12B, a vehicle 104 configured to support automated and/or semi-automated loading and unloading operations is shown, in accordance with an embodiment hereof. FIG. 12A shows a side-elevation view of the vehicle 104. FIG. 12B shows a top-down elevation view of the vehicle 104. The vehicle 104 includes a plurality of storage units 106 and a plurality of storage units 108, which may be designed to accommodate pallets of different sizes, and which may include adjustable/operable features, e.g., dividers, rollers, shifting mechanisms, and the like, that allow for different sized pallets to be accommodated, stored, and/or shifted. For example, the storage units 106, 108 may be sized to accommodate pallets suitable to be loaded and secured to a mobile robotic platform. The storage units 106, 108 extend along opposite sides of the vehicle 104, and are separated by a loading surface 112. The storage units 106, 108 may be used to store multiple objects, and/or to store multiple carriers with objects, e.g., those being transported to different destinations in a logistics network, e.g., along a last-distance delivery path.

The vehicle 104 may include components and features that support loading and unloading in automated or semi-automated fashion, as described in connection with FIG. 10. For example, during one operation, mobile robotic platforms 110 travel onto the loading surface 112, and objects or object carriers are then transferred onto the mobile robotic platforms 110 from the storage units 106, 108, e.g., using an ASRS, for subsequent transport to delivery destinations. In some embodiments, the storage units 106, 108 may include openings located on the outside of the vehicle 104. With this configuration, objects can be loaded into the storage units 106, 108 through such openings, or rather, from outside of the vehicle 104. In another embodiment, a roof 114 of the vehicle 104 may be displaceable, e.g., it may be pivotal, slidable, or otherwise openable as shown in FIG. 12A, to provide access to the interior of the vehicle 104 to support loading of objects. The opening of the roof 114 can be provided through linear displacement, pivoting displacement, or sliding displacement. This shifting may be provided through operation of actuators attached to roof 114, e.g., those directed by a computing device.

Embodiment 1. A mobile delivery system for transporting objects comprising a mobile robotic platform and a storage receptacle comprising a base, a plurality of walls extending from the base, the base and the plurality of walls defining a storage area, and a first coupling located on the base, the first coupling attachable to a second coupling located on the mobile robotic platform.

Embodiment 2. The mobile delivery system of embodiment 1, wherein the plurality of walls define an opening into the storage area, the opening located opposite to the base.

Embodiment 3. The mobile delivery system of any of embodiments 1-2, wherein the plurality of walls further define another opening at an end of the storage receptacle.

Embodiment 4. The mobile delivery system of any of embodiments 1-3, wherein the another opening includes a door configured to open and close.

Embodiment 5. The mobile delivery system of any of embodiments 1-4, wherein the storage area includes at least one divider that is extendable and retractable, and wherein the at least one divider is coupled to the base.

Embodiment 6. The mobile delivery system of any of embodiments 1-5, wherein the mobile robotic platform is configured to operate autonomously.

Embodiment 7. A mobile system for transporting objects comprising a frame comprising a plurality of connection points; and a plurality of pallets, each pallet comprising a corresponding coupling that is attachable at one of the plurality of connection points, and a mechanical coupling used for securing an object-carrier on the pallet.

Embodiment 8. The system of embodiment 7, wherein the system comprises two, four, six, or eight pallets.

Embodiment 9. The system of any of embodiments 7-8, wherein at least some of the plurality of pallets are a different size and/or a different shape.

Embodiment 10. The system of any of embodiments 7-9, wherein the mechanical coupling includes a first element located on the pallet and a second element located on the object-carrier, the first element and the second element being releasably attachable.

Embodiment 11. The system of any of embodiments 7-10, wherein the mechanical coupling comprises a clamping mechanism, a latching mechanism, a magnetic mechanism, or a male-female coupling.

Embodiment 12. A carrier for transporting objects comprising a base and a movable enclosure coupled to the base, the movable enclosure extending to a plurality of outer edges, the movable enclosure adjustable between a first configuration and a second configuration, the first configuration comprising an open configuration with the plurality of outer edges retracted toward the base, and the second configuration comprising an enclosed configuration with the plurality of outer edges extended from the base to at least partially enclose a storage space.

Embodiment 13. The carrier of embodiment 12, wherein the movable enclosure includes a frame that is rectangular in shape.

Embodiment 14. The carrier of any of embodiments 12-13, wherein the movable enclosure comprises a lattice structure interconnected by a plurality of hinges.

Embodiment 15. The carrier of any of embodiments 12-14, wherein, in the second configuration, the lattice structure extends about the storage space and the frame defines an opening located opposite to the base.

Embodiment 16. The carrier of any of embodiments 12-15, further comprising a cover, wherein, in at least the second configuration, the cover is securable over the opening.

Embodiment 17. A loading system for a vehicle comprising a first plurality of storage units extending along a first side of the vehicle, a second plurality of storage units extending along a second side of the vehicle opposite to the first side of the vehicle, a shuttle mechanism coupled between the first plurality of storage units and the second plurality of storage units, a loading surface extending between the first plurality of storage units and the second plurality of storage units, and a ramp coupled to the loading surface and movable between a lowered position and a raised position, wherein the shuttle mechanism is operable to shift objects from the first plurality of storage units and/or from the second plurality of storage units onto a mobile robotic platform positioned on the loading surface.

Embodiment 18. The loading system of embodiment 17, further comprising an object-engaging mechanism coupled to the shuttle mechanism, the object-engaging mechanism operable to engage an object stored on the first plurality of storage units and/or on the second plurality of storage units; and a track along which the shuttle mechanism translates.

Embodiment 19. The loading system of any of embodiments 17-18, wherein each one of the first plurality of storage units includes an opening located on an outside of the vehicle on the first side, and wherein each one of the second plurality of storage units includes an opening located on an outside of the vehicle on the second side.

Embodiment 20. The loading system of any of embodiments 17-19, further comprising a pair of movable elements coupled to the shuttle mechanism, the pair of movable elements adjustable for holding objects of different sizes.

Embodiment 21. Any of embodiments 1-20, in whole or in part, in any combination.

In some embodiments, this disclosure may include the language, for example, "at least one of [element A] and [element B]." This language may refer to one or more of the elements. For example, "at least one of A and B" may refer to "A," "B," or "A and B." In other words, "at least one of A and B" may refer to "at least one of A and at least one of B," or "at least either of A or B." In some embodiments, this disclosure may include the language, for example, "[element A], [element B], and/or [element C]." This language may refer to either of the elements or any combination thereof. In other words, "A, B, and/or C" may refer to "A," "B," "C," "A and B," "A and C," "B and C," or "A, B, and C."

The subject matter of this disclosure has been described in relation to particular embodiments, which are intended in all respects to be illustrative rather than restrictive. Alternative embodiments will become apparent to those of ordinary skill in the art to which the present subject matter pertains without departing from the scope hereof. Different combinations of elements, as well as use of elements not shown, are also possible and contemplated.

What is claimed is:

1. A system comprising:
   a mobile robotic platform; and
   a storage receptacle comprising:
   a base,
   a plurality of walls extending from the base, wherein the base and the plurality of walls defines a storage space and the plurality of walls defines an opening into the storage space that is located opposite the base, a divider coupled to the base, wherein the divider is extendable toward the opening to partition the storage space into multiple storage areas and the divider is retractable toward the base, thereby eliminating partitioning the storage space into the multiple storage areas, a biasing mechanism configured to bias the divider toward the opening; and a first coupling located on the base, wherein the first coupling is attachable to a second coupling located on the mobile robotic platform.

2. The system of claim 1, wherein the plurality of walls further defines a second opening at an end of the storage receptacle.

3. The system of claim 2, wherein the second opening includes a door configured to open and close.

4. The system of claim 1, wherein the mobile robotic platform is configured to operate autonomously.

5. A carrier comprising:

a first board formed at least partially of material that provides a rigidity;

a second board formed at least partially of the material; and an expandable frame formed at least partially of the material, wherein;

the expandable frame;

comprises corners that are configured to be attached to the first board and the second board, and is designed to be cut such that attachment of the corners of the expandable frame to the first board and the second board enables the expandable frame to be stretched to enclose an object in the carrier, at least one of a number or spacing of cuts of the expandable frame can be increased or decreased to form a desired number of layers in the expandable frame.

6. The carrier of claim 5, wherein the material is at least one of disposable or recyclable.

7. The carrier of claim 5, wherein the expandable frame comprises a sheet that is designed to be cut along legs of the expandable frame to allow the expandable frame to expand in a web-like configuration.

* * * * *